United States Patent
Aoyagi (10) Patent No.: US 9,980,537 B2
(45) Date of Patent: May 29, 2018

(54) LOCKING TONGUE

(71) Applicants: AUTOLIV DEVELOPMENT AB, Vargarda (SE); Mitsunori Aoyagi, Kanagawa (JP)

(72) Inventor: Mitsunori Aoyagi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 159 days.

(21) Appl. No.: 14/910,910

(22) PCT Filed: Aug. 15, 2014

(86) PCT No.: PCT/JP2014/071474
§ 371 (c)(1),
(2) Date: Feb. 8, 2016

(87) PCT Pub. No.: WO2015/025801
PCT Pub. Date: Feb. 26, 2015

(65) Prior Publication Data
US 2016/0206050 A1    Jul. 21, 2016

(30) Foreign Application Priority Data
Aug. 20, 2013    (JP) .................................. 2013-170586

(51) Int. Cl.
*A44B 11/00*    (2006.01)
*B60R 22/30*    (2006.01)
(Continued)

(52) U.S. Cl.
CPC ........ *A44B 11/006* (2013.01); *A44B 11/2561* (2013.01); *B60R 22/023* (2013.01);
(Continued)

(58) Field of Classification Search
CPC ............ A44B 11/2553; A44B 11/2561; A44B 11/006; B60R 21/18; B60R 21/30; B60R 22/023; B60R 2022/1812
(Continued)

(56) References Cited

U.S. PATENT DOCUMENTS 3,289,261 A * 12/1966 Davis ................. A44B 11/2526
                                                          24/193
4,294,467 A    10/1981 Frantom
(Continued)

FOREIGN PATENT DOCUMENTS

BR         8606389        12/1986
CN       103517833 A       1/2014
(Continued)

OTHER PUBLICATIONS

PCT International Search Report—dated Aug. 15, 2014.

*Primary Examiner* — Karen Beck
(74) *Attorney, Agent, or Firm* — Brinks Gilson & Lione (57) ABSTRACT

A seat belt restraint system locking tongue (10) having a locking member (30) which moves to a locked position to clamp a webbing (3) inserted in a shoulder-side webbing insertion slot (12) to restrict movement of the webbing (3). A tongue body (11) includes a restricting portion (25) near the shoulder-side webbing insertion slot (12) to clamp the webbing (3) with the locking member (30) when the locking member (3) moves to the locked position. The length in the longitudinal direction of the webbing insertion slot (12), of a portion of the restricting portion (25) that contacts the webbing (3) to clamp the webbing (3) is smaller than the width of the webbing (3). The locking tongue prevents fraying of the webbing (3) and improves the clamping performance in the event of a vehicle crash.

12 Claims, 9 Drawing Sheets

(51) Int. Cl.
*B60R 22/18* (2006.01)
*A44B 11/25* (2006.01)
*B60R 22/02* (2006.01)

(52) U.S. Cl.
CPC .............. *B60R 22/18* (2013.01); *B60R 22/30* (2013.01); *B60R 2022/1812* (2013.01)

(58) Field of Classification Search
USPC ...................................................... 280/801.1
See application file for complete search history.

(56) References Cited

U.S. PATENT DOCUMENTS

| | | | |
|---|---|---|---|
| 4,614,007 A | | 9/1986 | Else |
| 4,717,088 A | | 1/1988 | Föhl |
| 5,138,749 A | * | 8/1992 | McCune ............ A44B 11/2557 24/170 |
| 5,984,358 A | * | 11/1999 | Mar .................. A44B 11/2553 24/163 R |
| 7,404,239 B1 | * | 7/2008 | Walton .................. A44B 11/12 24/170 |
| 8,801,038 B2 | * | 8/2014 | Hori ........................ B60R 22/00 24/196 |
| 9,409,537 B2 | * | 8/2016 | Zhang .................... B60R 22/24 |
| 2001/0014997 A1 | | 8/2001 | Suzuki |
| 2004/0158955 A1 | * | 8/2004 | Acton ................ A44B 11/2557 24/265 BC |
| 2011/0119874 A1 | * | 5/2011 | Dziengowski ..... A44B 11/2561 24/181 |
| 2012/0286501 A1 | | 11/2012 | Goudeau et al. |
| 2017/0144623 A1 | * | 5/2017 | Cahill ..................... B60R 22/28 |

FOREIGN PATENT DOCUMENTS

| | | | | |
|---|---|---|---|---|
| DE | 35 46 227 A1 | | 7/1987 | |
| DE | 11 2012 002 030 T5 | | 2/2014 | |
| DE | 102013003109 A1 | * | 8/2014 | ......... A44B 11/2557 |
| EP | 0 180 310 A2 | | 9/1985 | |
| ES | 2 004 014 | | 12/1988 | |
| FR | 2 592 346 | | 12/1986 | |
| GB | 2 184 642 A | | 7/1987 | |
| IT | 1229555 B | | 12/1986 | |
| JP | 61-85242 A | | 4/1986 | |
| JP | 62-157847 A | | 7/1987 | |
| JP | 2001-347920 A | | 12/2001 | |
| JP | 52-151532 | | 5/2014 | |
| JP | 2014-513011 A | | 5/2014 | |
| JP | 2015003568 A | * | 1/2015 | |
| SE | 404-570 B | | 5/1991 | |
| WO | WO 2012/154504 A2 | | 11/2012 | |

* cited by examiner

LOCKING TONGUE

CROSS REFERENCE TO RELATED APPLICATIONS

This application claims priority to Japanese Application No. 2013-170586, filed on Aug. 20, 2013 and PCT/JP2014/071474, filed on Aug. 15, 2014.

FIELD OF THE INVENTION

The present invention relates to a locking tongue, and more specifically, to a locking tongue that is detachably coupled with a buckle of a seat belt system.

DESCRIPTION OF THE RELATED ART

Conventionally, a so-called three-point seat belt system for protecting a driver and a passenger in the event of a vehicle crash are widely used in vehicles such as automobiles. In a three-point seat belt apparatus, when a tongue is appropriately coupled with a buckle, an occupant is restrained by a lap belt that extends so as to cross the waist of the occupant sitting on a seat and a shoulder belt that extends so as to cross the chest of the occupant.

Moreover, a webbing is generally configured to be freely pulled from a retractor so that the occupant is restrained at a predetermined position. In the event of a vehicle crash, the retractor is locked by an inertia sensitive mechanism, for example, to prevent further pulling of the webbing. As a result, the webbing properly holds the occupant at a predetermined position on the seat in the event of a crash.

In the event of a vehicle crash, basically, the retractor is locked and the webbing is not pulled. In this case, although the tension on the lap side (the waist belt side) increases, the tension on the shoulder side (the shoulder belt side) also increases following the increase in the tension on the lap side. In order to prevent this, a locking tongue may be used (also called a crash locking tongue) in which a webbing inserted into a webbing insertion slot of the tongue is clamped to prevent movement of the webbing so that a shoulder belt and a lap belt are separated has been invented (for example, see Japanese Patent Application Publication No. 2009-525909 and Japanese Patent Application Publication No. 2008-500226).

A tongue plate (or latch plate) which is used in a seat belt system although not in the form of a locking tongue is widely used (for example, see Japanese Utility Model Application Publication No. 52-151532). In the tongue plate, a webbing in a webbing insertion slot is locked by a locking member to suppress a positional shift due to the weight of the tongue plate itself, and the webbing is unlocked by operating an unlocking member as necessary so that the position of the webbing in relation to the tongue plate can be changed.

However, the locking tongue requires a high clamping performance in the event of a vehicle crash. Conventionally, in order to obtain the high restraining performance, the webbing is conventionally clamped by sandwiching an entire width area thereof between a restricting portion formed of a resin material and a locking member formed of metal. However, when the webbing is clamped by pressing the locking member formed of metal against the entire width area of the webbing, the fiber at the edges of the webbing may be easily broken and fraying may occur. Since the frayed webbing may affect a variation in strength, it is desirable to suppress the fraying.

SUMMARY OF THE INVENTION

In the light of the above issues, an object of the present invention is to provide a locking tongue capable of preventing the fraying of a webbing due to a locking tongue of a seat belt and improving a clamping performance in the event of a vehicle crash.

According to the locking tongue of the present invention, the tongue body includes a restricting portion that is formed near the first webbing insertion slot so as to clamp the webbing together with the locking member when the locking member moves to the locked position, and the length in the longitudinal direction of the webbing insertion slot, of at least one of the portion of the locking member that makes contact with the webbing to clamp the webbing and the portion of the restricting portion that makes contact with the webbing to clamp the webbing is smaller than the width of the webbing. Thus, the restricting portion does not make contact with the edges of the webbing during clamping in the width direction. Therefore, the fraying of the edges of the webbing can be prevented, and the clamping performance in the event of a vehicle crash can be improved.

Since the locking member is molded with a resin, and at least the portion making contact with the webbing is covered with the resin, the webbing is not clamped by a metal portion and the fraying of the webbing can be suppressed more effectively.

BRIEF DESCRIPTION OF THE DRAWINGS

FIGS. 5A to 5C illustrate the locking member according to the present embodiment in which

DESCRIPTION OF THE PREFERRED EMBODIMENTS

Figure 1:
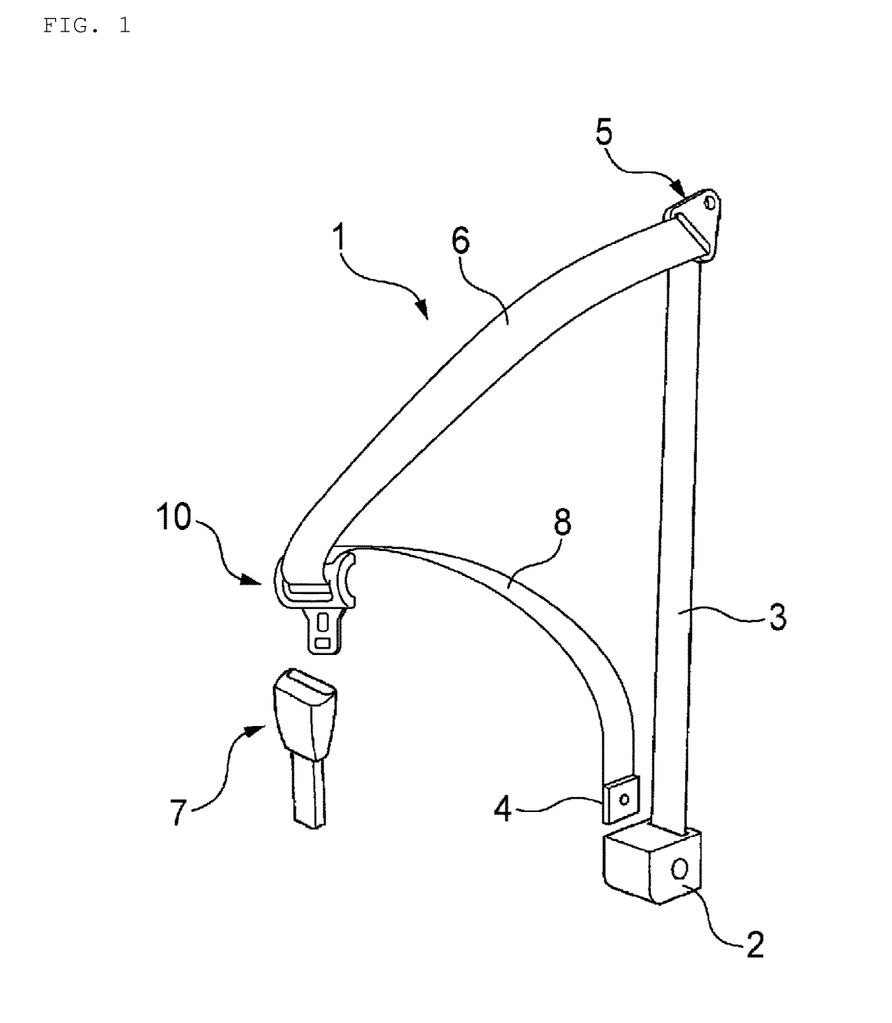
FIG. 1 is a perspective view schematically illustrating an example of a seat belt apparatus including a locking tongue according to the present invention.

Hereinafter, a locking tongue according to an embodiment of the present invention will be described in detail with reference to the drawings. FIG. 1 illustrates an example of a three-point seat belt apparatus 1 to which a locking tongue 10 is applied. The seat belt apparatus 1 includes a retractor 2 attached to the floor on one side of a seat (not illustrated) of a vehicle. One end of the webbing 3 is wound around a spring-biased inertia sensitive reel disposed inside the retractor 2, and the other end of the webbing 3 is fixed to the vehicle body by a lap anchor 4. The locking tongue 10 is slidably provided in the webbing 3, and the locking tongue 10 is detachably coupled with a buckle 7 provided on the opposite side from the retractor 2 in relation to the seat.

The webbing 3 substantially extends vertically upward from the retractor 2 toward the shoulder anchor 5. Moreover, the webbing 3 forms a shoulder belt 6 that extends obliquely downward from the shoulder anchor 5 toward the buckle 7 so as to be stretched from the occupant's shoulder toward the occupant's waist. Further, the webbing 3 forms a lap belt 8 that extends in a vehicle width direction from the buckle 7 toward the lap anchor 4 so as to cross the waist of the occupant.

Figure 2:
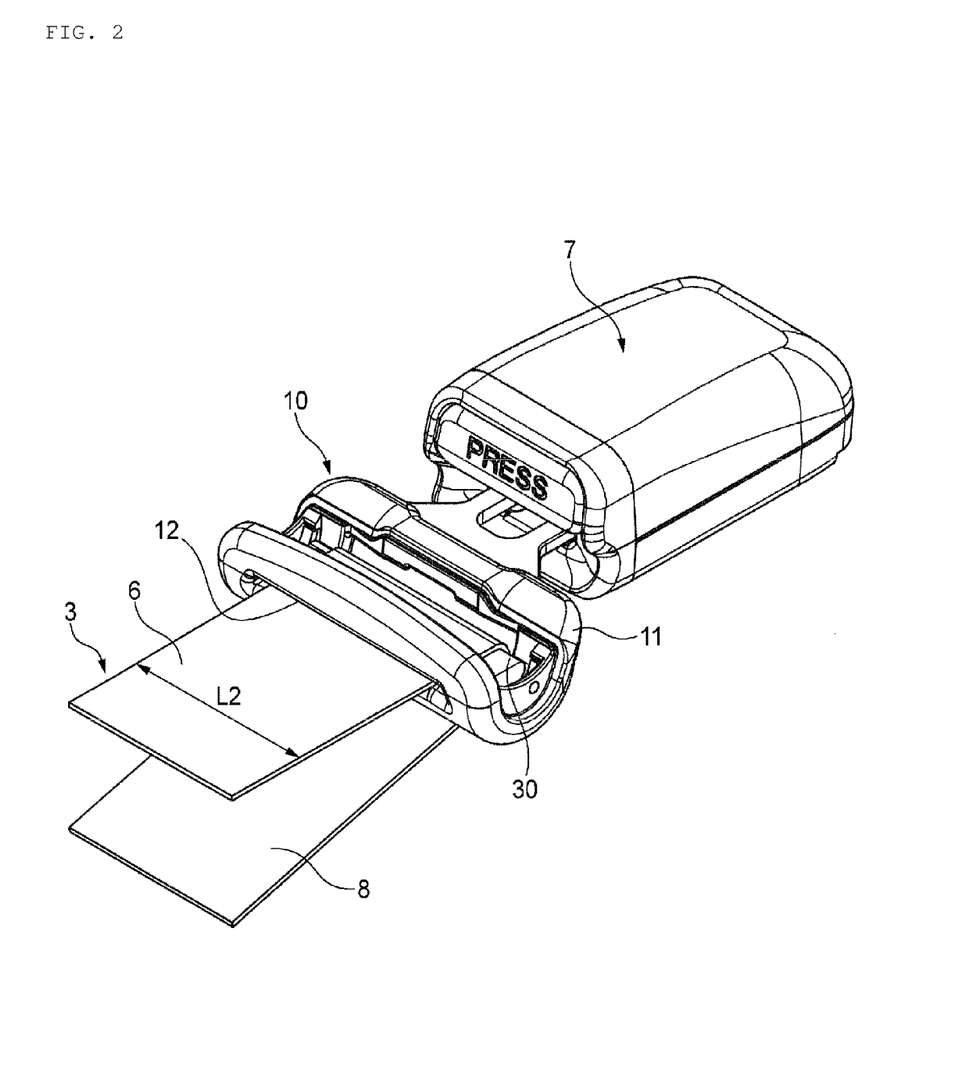
FIG. 2 is a perspective view illustrating a state in which a locking tongue is coupled with a buckle at an enlarged scale.
Figure 3:
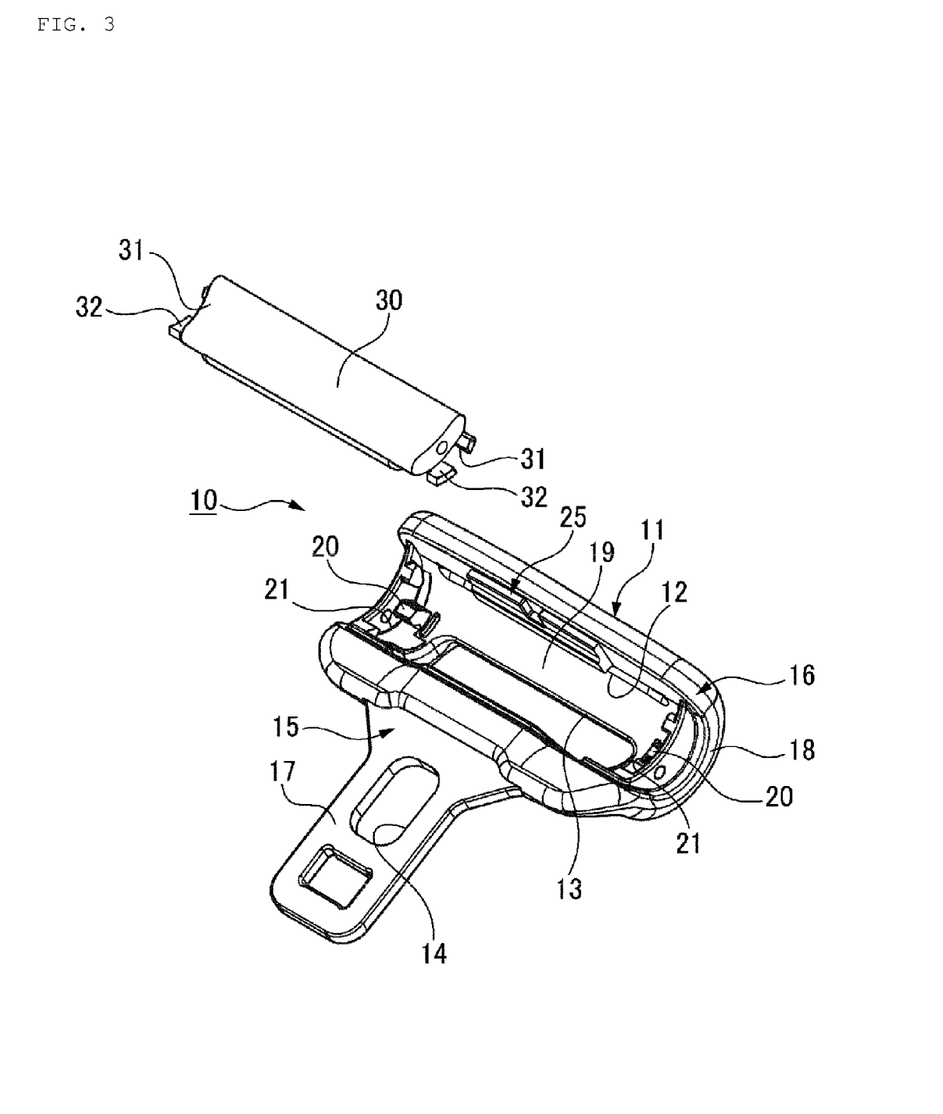
FIG. 3 is an exploded perspective view illustrating a state in which a tongue body of the locking tongue is detached from a locking member.
Figure 4:
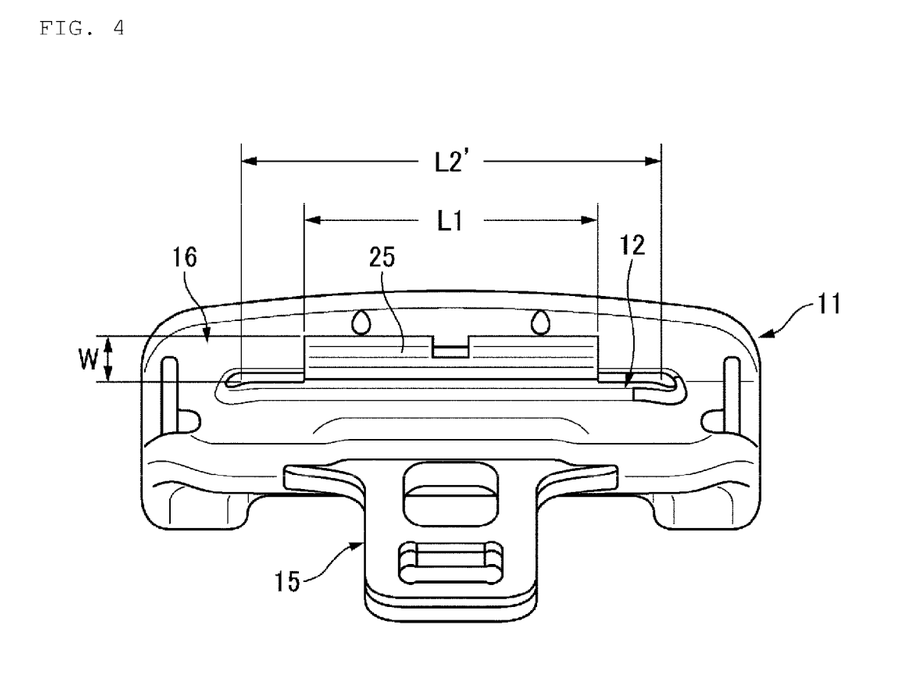
FIG. 4 is a side view illustrating a restricting portion according to the present embodiment.

As illustrated in FIGS. 2 to 4, the locking tongue 10 includes a tongue body 11 and a locking member 30. The tongue body 11 is configured to be coupled with the buckle 7 and includes a shoulder-side webbing insertion slot (first webbing insertion slot) 12 and a waist-side webbing insertion slot (second webbing insertion slot) 13 in which the webbing 3 is inserted. The locking member 30 is held in the tongue body 11 so as to be movable between an unlocked position at which the locking member 30 is separated from the shoulder-side webbing insertion slot 12 and a locked position at which the locking member 30 approaches the shoulder-side webbing insertion slot 12. When the locking member 30 moves to the locked position, the locking member 30 clamps the webbing 3 inserted in the shoulder-side webbing insertion slot 12 to restrict movement of the webbing 3.

The tongue body 11 includes a tongue plate 15 formed of metal and a resin mold 16 that partially covers the tongue plate 15 and forms the two webbing insertion slots 12 and 13. Moreover, the tongue body 11 includes a flat portion 17 in which the tongue plate 15 is exposed and a curved portion 18 which is covered with the resin mold 16 and in which the locking member 30 is disposed. An opening 14 that engages with a lock element (not illustrated) provided inside the buckle 7 is formed in the flat portion 17.

An inner guide surface 19 that rotatably supports the locking member 30 is formed on the inner side of the curved portion 18 that is positioned between the two webbing insertion slots 12 and 13. Moreover, a restricting portion 25 that clamps the webbing 3 together with the locking member 30 when the locking member 30 moves to the locked position is formed near the shoulder-side webbing insertion slot 12 on the inner side of the curved portion 18 that is positioned between the two webbing insertion slots 12 and 13, on the opposite side from the inner guide surface 19 in relation to the shoulder-side webbing insertion slot 12 (see FIGS. 6A and 6B). As illustrated in FIG. 4, a length L1 in the longitudinal direction of the webbing insertion slot 12, of a portion of the restricting portion 25 that makes contact with the webbing 3 to clamp the webbing 3 is smaller than the width L2 of the webbing 3 illustrated in FIG. 2 (that is, smaller than a length L2' of the shoulder-side webbing insertion slot 12). Due to this, when the locking member 30 is at the locked position, the restricting portion 25 clamps the webbing 3 together with the locking member 30 at an intermediate portion of the webbing 3 in the width direction and the restricting portion 25 does not make contact with both ends of the webbing 3 in the width direction.

A pair of projection portions (positioning portions) 20 that stands up toward the inner side is formed in the tongue body 11 on both sides of the inner guide surface 19 in the width direction. The pair of projection portions 20 is formed integrally with the resin mold 16 and is configured to engage with a pair of notches 31 formed on both sides of the locking member 30 in the width direction so that the locking member 30 is positioned at the unlocked position (see FIG. 6A). Moreover, the projection portion 20 is designed to be broken when force of a predetermined value or more is applied from the webbing 3 close to the shoulder belt 6.

Curved guide portions 32 are formed on both side of the locking member 30 in the width direction and the guide portions 32 are guided along curved guide grooves 21 formed on both sides of the curved portion 18 in the width direction. Moreover, the locking member 30 disposed on the inner side of the curved portion 18 is in contact with and is covered with the webbing 3 that is folded back and positioned between the two webbing insertion slots 12 and 13.

Figure 5:
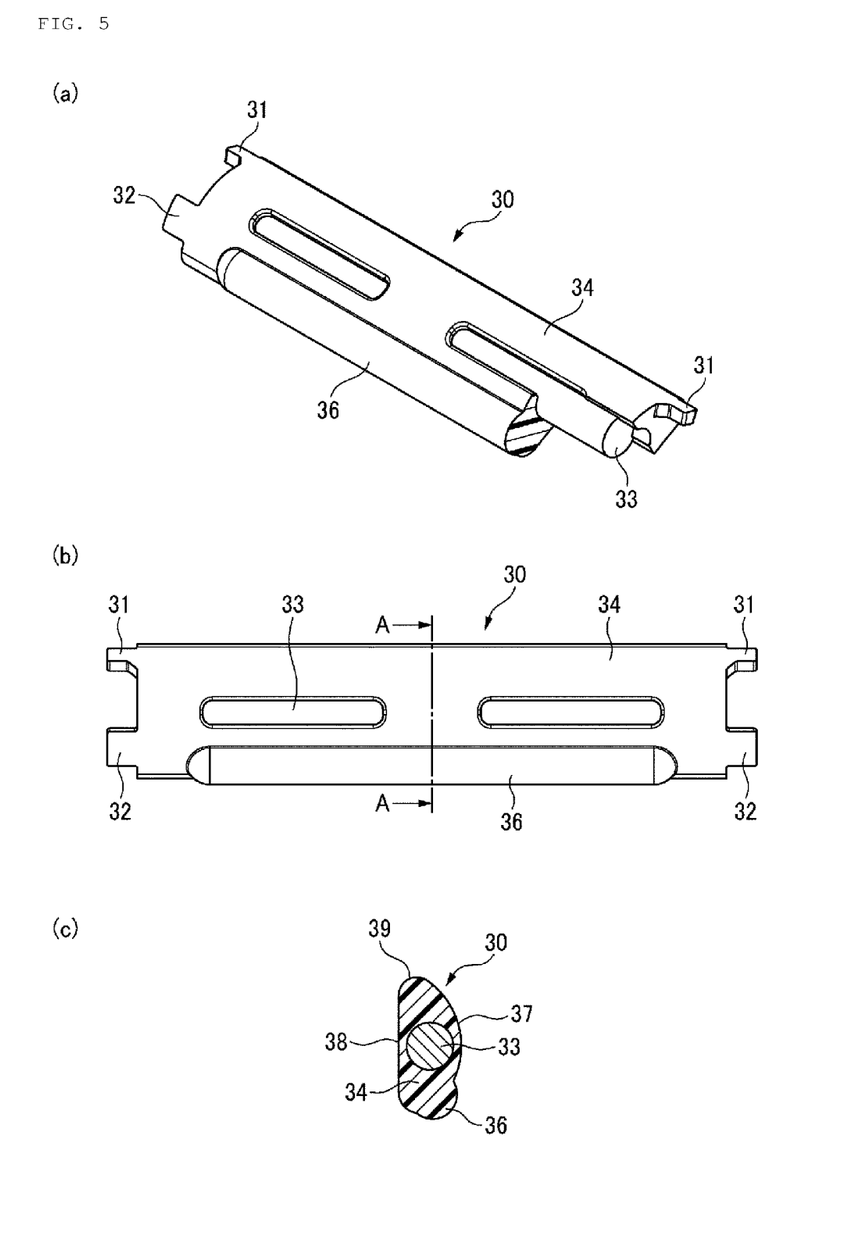
FIG. 5A is a perspective view with a portion notched.
FIG. 5B is a plan view.
FIG. 5C is a cross-sectional view along line A-A in FIG. 5B.

As illustrated in FIGS. 5A to 5C, the locking member 30 is formed by resin-molding using a columnar metal member 33 for strength reinforcement, and at least a portion thereof in contact with the webbing 3 is covered with a resin 34.

Moreover, although rotation of the locking member 30 is restricted by the restricting portion 25, the rotation restriction may be supported using an emboss portion (convex portion having a curved cross-section) 36 provided in the locking member 30. In this way, the stopper performance of the locking member 30 can be improved. Moreover, since the emboss portion 36 is formed in the folded-back portion of the webbing 3, it is possible to increase the curvature of that portion and to prevent concentration of stress on the webbing 3. Further, it is possible to change a belt path and to improve the abrasion performance of the webbing 3. Further, since the thickness of the locking member 30 itself increases at the folded-back portion, it is possible to increase the rigidity of the locking member 30 and to improve the lock performance.

Figure 6:
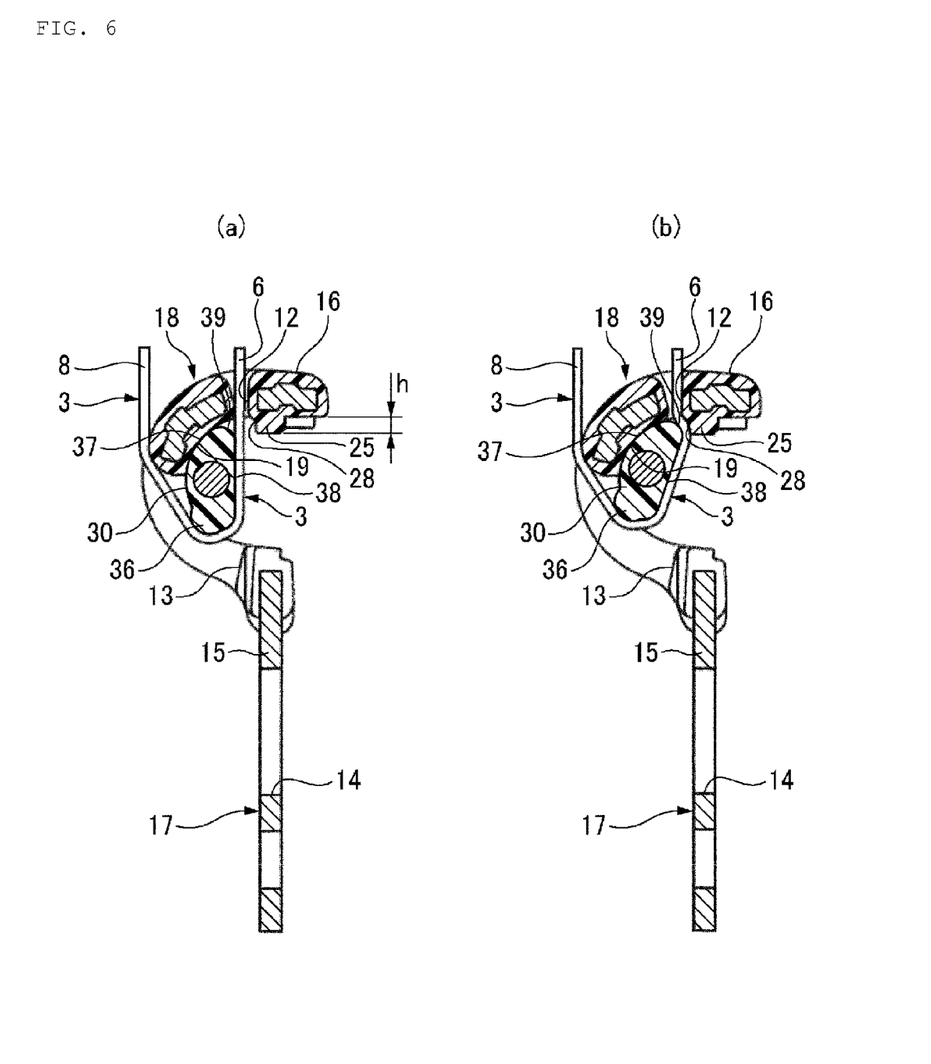
FIG. 6A is a cross-sectional view illustrating a locking tongue in a normal use state and FIG. 6B is a cross-sectional view illustrating the locking tongue in a locked state.

In the locking tongue 10 having such a configuration, the locking member 30 is locked by the projection portion 20 of the tongue body 11 in the normal use state and is positioned at the unlocked position on the inner side of the curved portion 18 as illustrated in FIG. 6A. When the locking member 30 is positioned at the unlocked position, the webbing 3 can freely move through the two webbing insertion slots 12 and 13 rather than the movement in relation to the tongue body 11 being restricted. Due to this, the locking member 30 has a curved surface 37 having approximately the same curvature as the inner guide surface 19 of the tongue body 11. Moreover, the locking member 30 has a flat surface 38 that is provided on the opposite side from the curved surface 37 in relation to the metal member 33 so as to linearly guide the webbing 3 that passes through the webbing insertion slot 12 when the locking member 30 is positioned at the unlocked position.

On the other hand, in a sate in which the locking tongue 10 is attached to the buckle 7, when force of a predetermined value or more is applied to the webbing 3 (that is, the shoulder belt 6 that restrains the upper body of an occupant) in the event of a vehicle crash or the like, the locking member 30 is pressed by the tension of the webbing 3 and the projection portion 20 is broken by the notches 31. Further, the guide portion 32 of the locking member 30 is guided to the guide groove 21 by the force acting on the webbing 3, and the locking member 30 makes contact with the restricting portion 25 of the resin mold 16 with the webbing 3 interposed and moves to the locked position as illustrated in FIG. 6B. When the locking member 30 moves to the locked position, the webbing 3 is clamped by the locking member 30 and the restricting portion 25 so that the movement of the webbing 3 is prevented.

As a result, even when the tension on the lap belt 8 increases, since the webbing 3 is restrained by the locking member 30 and the restricting portion 25, the tension on the lap belt 8 will not be transmitted to the shoulder belt 6. When the shoulder-side belt is pulled in the event of emergency such as the activation of a load limiter, since the lap-side webbing 3 is locked, the pulled webbing 3 is used on the shoulder side. Thus, it is possible to prevent the webbing 3 from pressing the chest of an occupant with force stronger than necessary.

In this case, the length L1 in the longitudinal direction of the webbing insertion slot 12, of a portion of the restricting portion 25 that clamps the webbing 3 is smaller than the width L2 of the webbing 3, and the restricting portion 25 is formed in the intermediate portion of the shoulder-side webbing insertion slot 12 in the width direction of the webbing 3. Thus, when the webbing 3 is clamped by the locking member 30, the restricting portion 25 does not make contact with the edges of the webbing 3 in the width direction. As a result, it is possible to prevent fraying which conventionally occurred in the edges of the webbing 3 in the width direction. Moreover, since the portion of the locking member 30 that makes contact with the webbing 3 at least during clamping is covered with the resin 34, since the webbing 3 is sandwiched and clamped by resins, it is possible to suppress fraying of the webbing 3 more effectively.

As illustrated in FIGS. 6A and 6B, the portion of the locking member 30 that makes contact with the webbing 3 to clamp the webbing 3 is configured as the convex curved surface 39 and the portion of the restricting portion 25 that makes contact with the webbing 3 to clamp the webbing 3 is configured as the concave curved surface 28 so that the convex curved surface 39 and the concave curved surface 28 engage with each other with the webbing 3 interposed. Due to this, when the locking member 30 is positioned at the locked position, the locking member 30 and the restricting portion 25 can clamp the webbing 3 more tightly. The convex curved surface 39 of the locking member 30 is formed so as to be smoothly continuous between the curved surface 37 and the flat surface 38.

A portion of the locking member 30 that makes contact with the webbing 3 to clamp the webbing 3 may be configured as a concave curved surface and a portion of the restricting portion 25 that makes contact with the webbing 3 to clamp the webbing 3 may be configured as a convex curved surface so that the webbing 3 is clamped.

The restricting portion 25 has a height h that secures the concave curved surface 28 and a width W in a moving direction of the locking member 30, larger than the height h of the restricting portion 25 (see FIG. 6A) so as to endure the impact when the locking member 30 moves to the locked position (see FIG. 4).

As described above, according to the locking tongue 10 of the present embodiment, the tongue body 11 includes the restricting portion 25 that is formed near the shoulder-side webbing insertion slot 12 so as to clamp the webbing 3 together with the locking member 30 when the locking member 30 moves to the locked position. The restricting portion 25 makes contact with the webbing 3, and the length L1 in the longitudinal direction of the webbing insertion slot 12, of a portion of the restricting portion 25 that makes contact with the webbing 3 to clamp the webbing 3 is smaller than the width L2 of the webbing 3. Thus, the portion of the restricting portion 25 that clamps the webbing 3 during clamping does not make contact with the end of the webbing 3 in the width direction (i.e. the edges of the webbing). Therefore, the fraying of the ends of the webbing 3 can be prevented, and the clamping performance in the event of a vehicle crash can be improved.

Since the locking member 30 is molded with the resin 34 and at least the portion making contact with the webbing 3 is covered with the resin 34, the webbing 3 is not clamped by a metal portion and the fraying of the webbing 3 can be suppressed more effectively.

Figure 7:
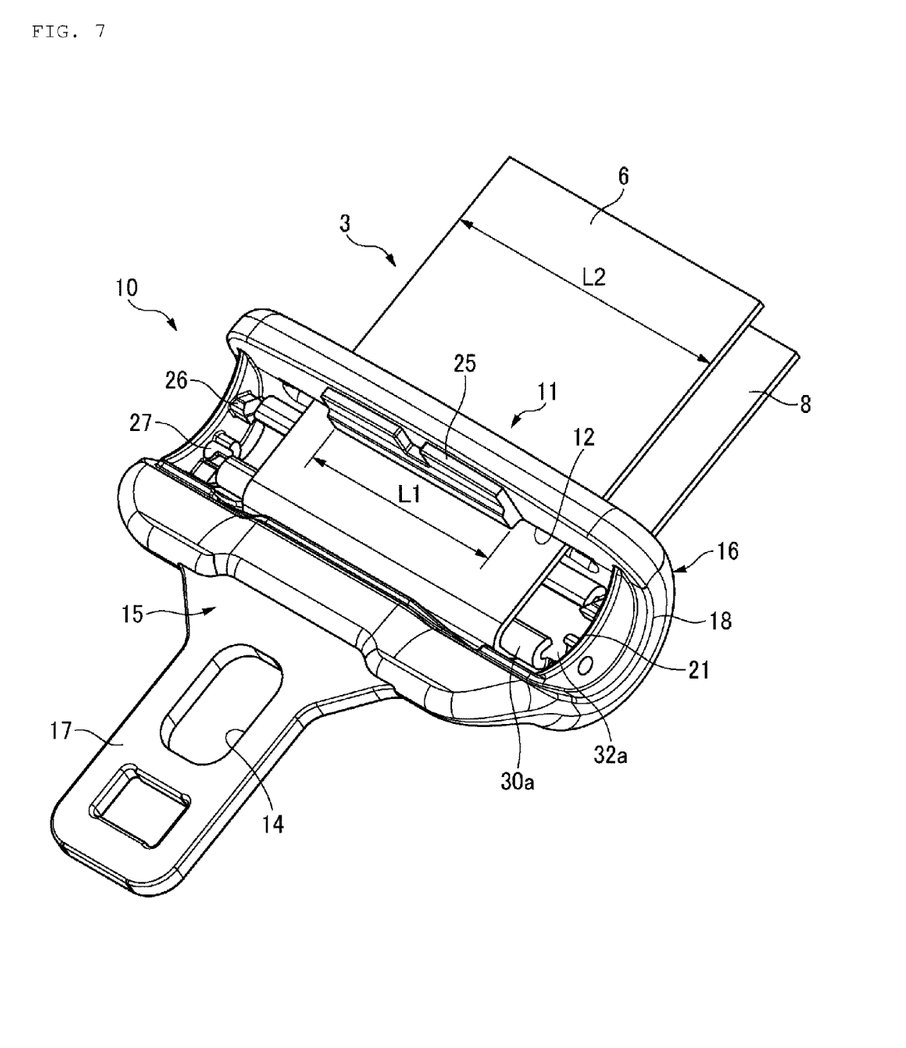
FIG. 7 is a rear perspective view of a locking tongue in which a webbing is inserted, according to another embodiment of the present invention.
Figure 8:
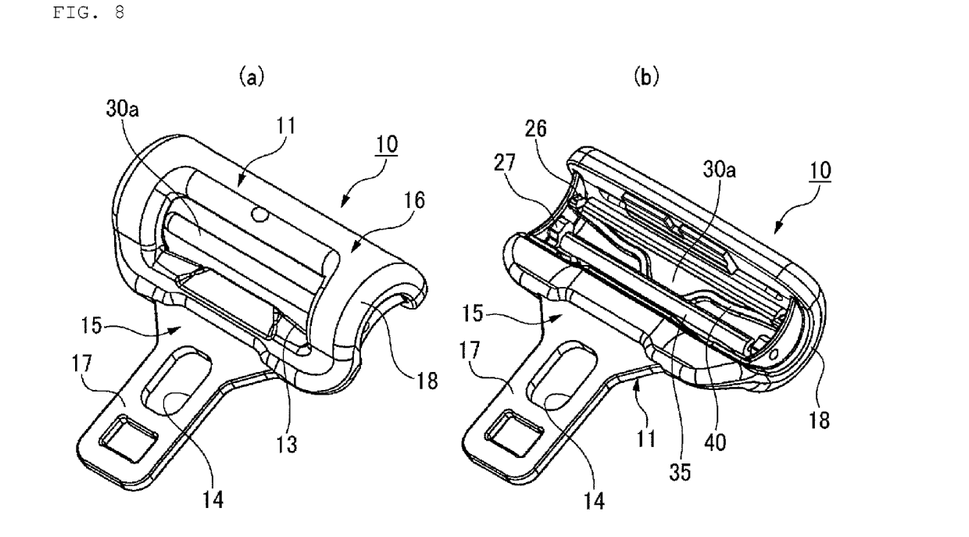
FIG. 8A is a front perspective view of the locking tongue illustrated in FIG. 7.
FIG. 8B is a rear perspective view of the locking tongue.
Figure 9:
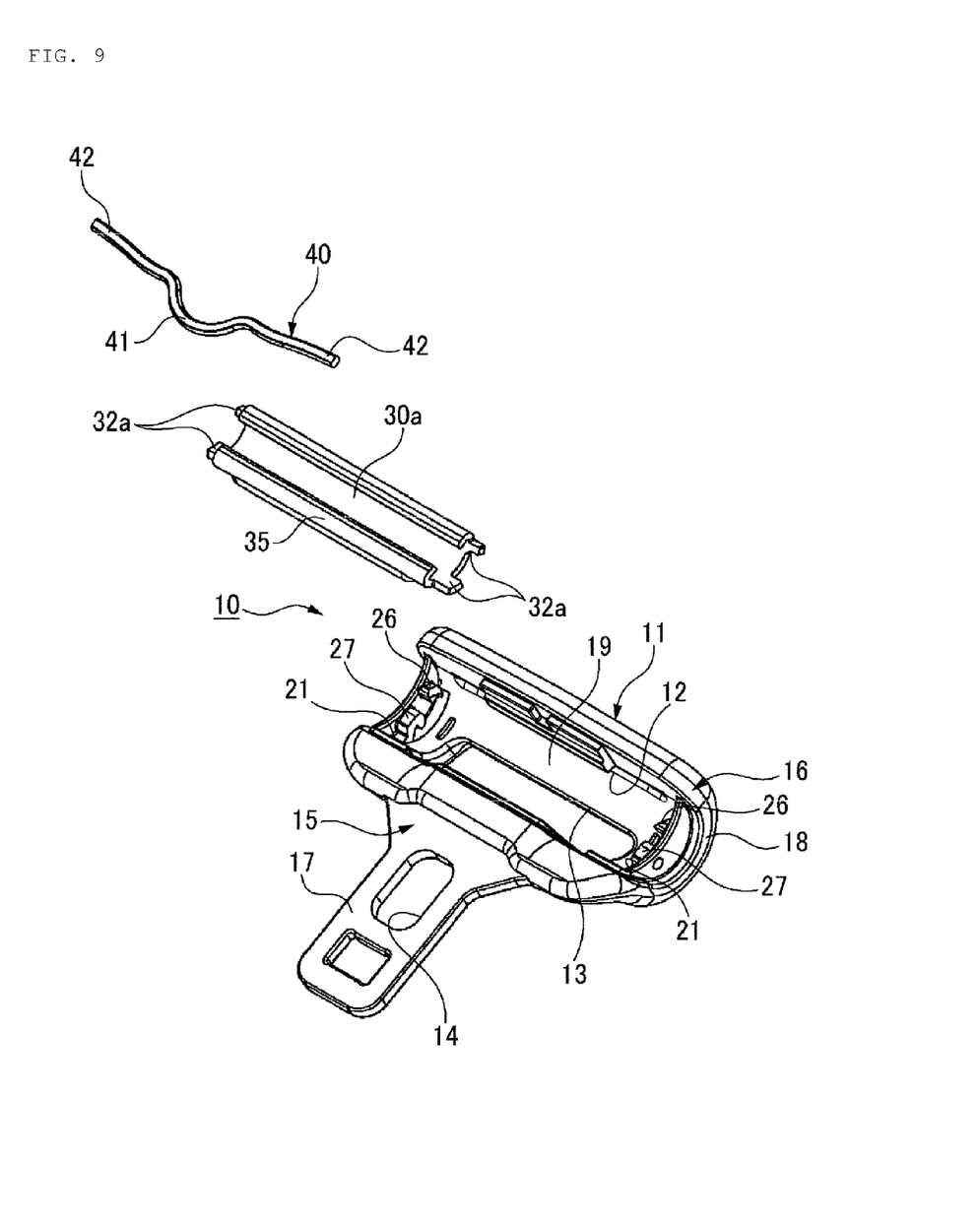
FIG. 9 is an exploded perspective view illustrating a state in which a locking member and a spring are detached from the tongue member illustrated in FIG. 7.

FIGS. 7 to 9 illustrate a locking tongue 10 according to another embodiment of the present invention. The same or equivalent portions as those of the embodiment will be denoted by the same or corresponding reference numerals and the description thereof will not be repeated.

In the locking tongue 10, a spring member (biasing member) 40 formed in a wire form and having a curved intermediate portion 41 is provided. That is, in the locking tongue 10, a locking member 30a is positioned at the unlocked position by the spring member 40 instead of the projection portion 20 according to the above-described embodiment.

Thus, the entire locking member 30a is formed of a metal member and has, on both sides thereof in the width direction, a pair of guide portions 32a which is guided along the curved guide grooves 21 of the tongue body 11. Moreover, the locking member 30a has an intermediate portion holder 35 that curves the ends close to the unlocked position over the entire width direction of the webbing 3 to hold the intermediate portion 41 of the spring member 40.

The tongue body 11 includes a pair of end holders 26 that holds both ends 42 of the spring member 40 and supporting portions 27 that support the guide portions 32a of the locking member 30a positioned at the unlocked position are formed in the tongue body 11 at a position closer to the locked position than the intermediate portion holder 35. The end holder 26 and the supporting portion 27 are formed of the resin mold 16.

Due to this, the spring member 40 is held by the tongue body 11 and the locking member 30a and biases the locking member 30a toward the unlocked position so that the locking member 30a is positioned at the unlocked position in the normal use state. Moreover, when force of a predetermined value or more is applied to the webbing 3 in the event of a vehicle crash or the like, the locking member 30a moves to the locked position while resisting the biasing force of the spring member 40 to clamp the webbing 3 and prevent the movement of the webbing 3. As a result, similarly to the above-described embodiment, even when the tension on the lap belt 8 increases, since the webbing 3 is restrained by the locking member 30a, the tension on the lap belt 8 will not be transmitted to the shoulder belt 6. When the shoulder-side belt is pulled in the event of emergency such as the activation of a load limiter, since the lap-side webbing 3 is locked, the pulled webbing 3 is used on the shoulder side. Thus, it is possible to prevent the webbing 3 from pressing the chest of an occupant with force stronger than necessary. Further, when the force of a predetermined value or more acting on the webbing 3 is released, since the locking member 30a returns to the original unlocked position, the projection portions will not be broken unlike the above-described embodiment and can be used again.

In the present embodiment, the length L1 in the longitudinal direction of the webbing insertion slot 12, of the portion of the restricting portion 25 that makes contact with the webbing 3 to clamp the webbing 3 is smaller than the width L2 of the webbing 3. Thus, the portion of the restricting portion 25 that clamps the webbing 3 during clamping will not make contact with the edges of the webbing 3 in the width direction, and the fraying in the ends of the webbing 3 can be prevented.

The other constituent elements and operations are the same as those of the above-described embodiment. Moreover, the shape of the biasing member is not limited to the shape of the spring member 40 according to the present embodiment as long as the biasing member can bias the locking member 30a toward the unlocked position like the spring member 40.

The present invention is not limited to the above-described embodiments, but various improvements and modifications can naturally be made appropriately without departing from the spirit of the present invention.

In the present embodiment, the length L1 in the longitudinal direction of the webbing insertion slot 12, of the portion of the restricting portion 25 that makes contact with the webbing 3 to clamp the webbing 3 is smaller than the width L2 of the webbing 3. However, the present invention is not limited thereto, but the length in the longitudinal direction of the webbing insertion slot 12, at least one of the portion of the locking member 30 or 30a that makes contact with the webbing 3 to clamp the webbing 3 and the portion of the restricting portion 25 that makes contact with the webbing 3 to clamp the webbing 3 may be smaller than the width L2 of the webbing 3.

While the above description constitutes the preferred embodiment of the present invention, it will be appreciated that the invention is susceptible to modification, variation and change without departing from the proper scope and fair meaning of the accompanying claims.

What is claimed is:

1. A locking tongue for a belt restraint system and being detachably connectable to a buckle movable along a belt webbing comprising;
   a tongue body configured to be coupled with the buckle and having at least a first and a second webbing insertion slot each adapted for insertion of the webbing,
   a locking member held in the tongue body so as to be movable between an unlocked position at which the locking member is separated from the first webbing insertion slot and a locked position at which the locking member approaches the first webbing insertion slot, wherein the locking member moves to the locked position to clamp the webbing inserted into the first webbing insertion slot to restrict movement of the webbing,
   the tongue body includes a restricting portion formed near the first webbing insertion slot to clamp the webbing together with the locking member when the locking member moves to the locked position, and
   a length in a longitudinal direction of the first webbing insertion slot, of at least one of a portion of the locking member that makes contact with the webbing to clamp the webbing and a portion of the restricting portion that makes contact with the webbing to clamp the webbing, is smaller than a width of the webbing.

2. The locking tongue according to claim 1 further comprising;
   the locking member is molded with a resin and the portion of the locking member that makes contact with the webbing is covered with the resin.

3. The locking tongue according to claim 1 further comprising; the restricting portion and the locking member clamp the webbing at an intermediate portion of the webbing in a width direction of the webbing when the locking member is positioned at the locked position, and at least one of the portion of the locking member that clamps the webbing and the portion of the restricting portion that clamps the webbing does not make contact with either of two side edges of the webbing in the width direction.

4. The locking tongue according to claim 1 further comprising; any one of the portion of the locking member that makes contact with the webbing to clamp the webbing and the portion of the restricting portion that makes contact with the webbing to clamp the webbing has a convex curved surface, and the other portion has a concave curved surface, and
   the convex curved surface and the concave curved surface are configured to engage with each other with the webbing interposed therebetween.

5. A seat belt apparatus comprising; the locking tongue according to claim 1.

6. The locking tongue according to claim 1 further comprising; wherein at least one of the portion of the locking member that makes contact with the webbing to clamp the webbing and the portion of the restricting portion that makes contact with the webbing to clamp the webbing, is centered with respect to the width of the webbing.

7. The locking tongue according to claim 1 further comprising; wherein the locking member is prevented from moving to the locked position until a predetermined tension load is applied onto the webbing.

8. The locking tongue according to claim 7 further comprising; wherein at least one element fails in response to the predetermined tension load thereby allowing movement of the locking member to the locked position.

9. The locking tongue according to claim 7 further comprising; the locking member is urged toward the unlocked position by a spring element.

10. The locking tongue according to claim 1 further comprising; the locking member is biased to the unlocked position by a tension exerted on the webbing.

11. The locking tongue according to claim 1, wherein the restriction portion includes a clamping surface that clamps the webbing when the locking member is in the locked position, wherein the clamping surface has a height against which the locking member is secured during clamping, and wherein the restricting portion further includes a width in a moving direction of the locking member, wherein the width is greater than the height.

12. The locking tongue according to claim 1, wherein the locking member includes guide portions formed on both of two sides of the locking member, and the locking member is guided along one or more curved guide grooves formed on both of the two sides of the tongue body.

* * * * *